(12) United States Patent
Fujii et al.

(10) Patent No.: US 6,339,267 B1
(45) Date of Patent: Jan. 15, 2002

(54) MOTOR APPARATUS HAVING VIBRATION RESTRICTING MECHANISM

(75) Inventors: Yoshikazu Fujii, Toyohashi; Hideto Matsuzaki, Kosai, both of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/651,277

(22) Filed: Aug. 30, 2000

(30) Foreign Application Priority Data

Sep. 1, 1999 (JP) ............................................. 11-247980
Aug. 4, 2000 (JP) ............................................. 12-236967

(51) Int. Cl.[7] .............................. H02K 5/24; H02K 5/00
(52) U.S. Cl. ............................................ 310/51; 310/91
(58) Field of Search .............................. 310/91, 51, 66; 411/34

(56) References Cited

U.S. PATENT DOCUMENTS 5,051,636 A * 9/1991 Ishimoto et al. ............... 310/90
5,214,448 A * 5/1993 Venthem .................. 346/139 R

FOREIGN PATENT DOCUMENTS

DE 545003 A2 * 6/1993
JP Y2-2599098 7/1999
JP 11-289735 10/1999

* cited by examiner

Primary Examiner—Nestor Ramirez
Assistant Examiner—Guillermo Perez
(74) Attorney, Agent, or Firm—Law Office of David G. Poss (57) ABSTRACT

In a brushless motor apparatus, a rotor is rotatbly supported on a stator so that the rotor is rotated by energization of the stator. The stator has a center piece that has a fixing plate at one end. The fixing plate is formed with bosses. Each boss is fixed to a motor holder through a vibration-resistricting cushion. The cushion is shaped cylindrically to be fit tightly on the boss. The cushion is formed with an annular groove on its outer peripheral surface at a position intermediate its axial ends, and is fit tightly in an elliptic fixing hole formed in the motor holder through the annular groove. The cushion has an abutting surface on its inner peripheral wall at the intermediate position so that the cushion abuts the boss at the abutting surface. The abutting surface has an axial length shorter than the entire axial length of the cushion. The cushion is held tightly to the fixing plate by threading a holding plate to the fixing plate in the axial direction.

20 Claims, 6 Drawing Sheets

MOTOR APPARATUS HAVING VIBRATION RESTRICTING MECHANISM

CROSS REFERENCE TO RELATED APPLICATION

This application relates to and incorporates herein by reference Japanese Patent Applications No. 11-247980 filed Sep. 1, 1999 and No. 2000-236967 filed Aug. 4, 2000.

BACKGROUND OF THE INVENTION

The present invention relates to a motor apparatus that may be used for blower motors in vehicular air conditioner systems.

Outer rotor-type brushless motors are used as blower motors for vehicular air conditioners. In this type of motors, a rotor vibrates while in operation. It is proposed in JP-A-11-289735 published on Oct. 19, 1999 to minimize this vibration by fixing bosses of a fixing plate to a casing via vibration-restricting cushions. In the case of three-phase full-wave six-pole motor, for instance, the vibrations arise from magnetic variation generated when a stator coil passes permanent magnets. This vibration results in the eighteenth-order vibration component (18f) that occurs eighteen times per rotation of the rotor. The vibration also arises when the rotor rotates with its rotary axis being inclined from its normal rotation axis. This inclined rotary motion is caused from weight imbalance of the rotor including a fan fixed at one end of a rotor shaft. This vibration results in the first-order vibration component (1f) that occurs once per rotation of the rotor.

Figure 6:
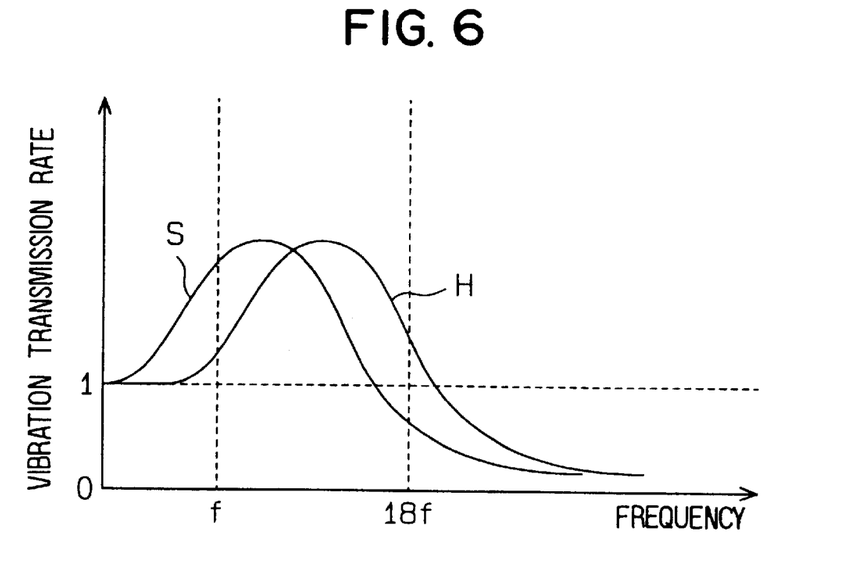
FIG. 6 is a characteristic diagram showing a vibration transmission characteristics.

As indicated by a curve S in FIG. 6, the vibration transmission rate of the eighteenth-order vibration component (18f) is low but the rate of the first-order vibration component (1f) is high, if the cushion is made of a low hardness material (soft material). Thus, the vibration arising from the weight imbalance cannot be sufficiently reduced, although the vibration arising from the magnetic variation can be sufficiently reduced. On the contrary, as indicated by a curve H, the vibration transmission rate of the first-order vibration component (1f) and the rate of the eighteenth-order vibration component (18f) are generally the same, if the cushion is made of a high hardness material (hard material H). Thus, both of the vibrations arising from the magnetic variation and arising from the weight imbalance cannot be sufficiently reduced.

SUMMARY OF THE INVENTION

It is an object of the present invention to provide a motor apparatus that is less vibrant against magnetic variation and weight imbalance of a rotor.

According to the present invention, a motor apparatus comprises a motor holder formed with a plurality of fixing holes, a stator having a fixing plate, a rotor rotatably supported by the stator, and a cushion interposed between the motor holder and the fixing plate.

In one aspect of the invention, the cushion is formed in generally a cylindrical shape to have an abutting surface on an inner peripheral surface for abutment with an outer peripheral surface of a boss formed integrally with the fixing plate or a fixing member. The cushion is formed to have an annular groove on an outer peripheral surface for engagement with the motor holder. The inner abutting surface has an axial length shorter than an entire axial length of the cushion.

In another aspect of the invention, the cushion is divided into a first cushion and a second cushion, and the fixing holes are divided into a first fixing hole and a second fixing hole. A boss of the fixing plate or a fixing member is fit in the first cushion fit in the first fixing hole. No boss nor fixing member is fit in the second cushion fit in the second fixing hole. The first cushion and the second cushion are fixedly held to the fixing plate by a holding plate in an axial direction.

Preferably, each of the fixing holes is formed in an elongated shape in a circumferential direction so that the cushion is deformed to provide a small spring constant in a rotation direction of the rotor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in further detail with reference to various embodiments in which a brushless motor apparatus is used for a blower motor unit in a vehicular air conditioner system.

(First Embodiment)

Figure 1:
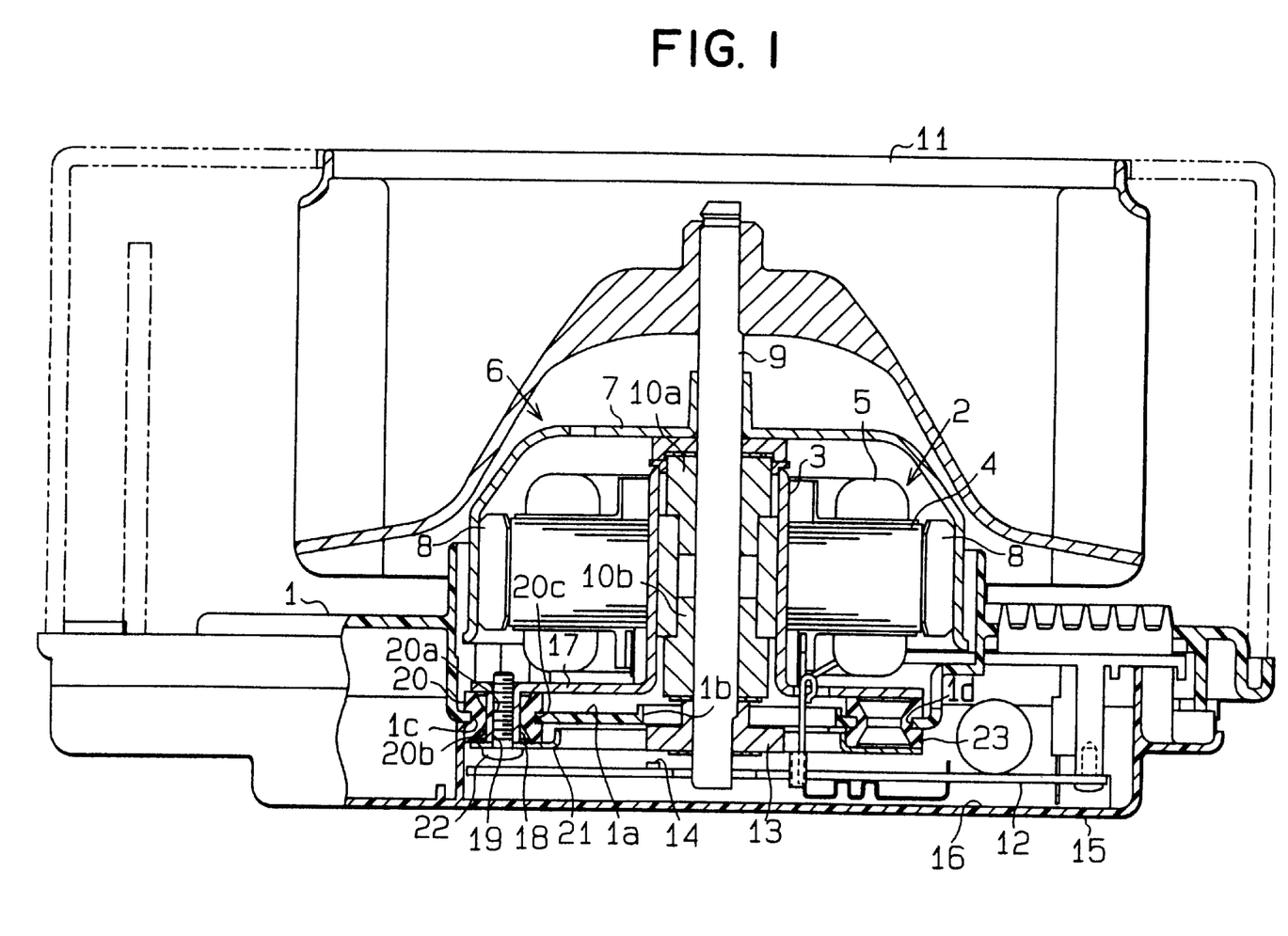
FIG. 1 is a sectional view of a brushless motor apparatus according to a first embodiment of the invention.

Referring to FIG. 1, a motor holder 1 is made of a synthetic resin and fixedly hold a stator 2 therein. The stator 2 includes a center piece 3, a core 4, and windings 5 wound on the core 4. The stator 2 rotatably supports a rotor 6. The rotor 6 includes a yoke 7, a plurality of permanent magnets 8 fixed to the inner peripheral surface of the yoke 7, and an output shaft 9 press-fit in the central part of the yoke 7. The output shaft 9 is rotatably supported at the central part of the center piece 3 through bearings 10a and 10b. A scirocco-type fan 11 is fixed to the top end of the output shaft 9.

An electrical circuit plate 12 is screwed to the bottom surface of the motor holder 1. The circuit plate 12 mounts thereon a number of electronic parts of an exciting circuit. The exciting circuit supplies an exciting current to the winding 5 to rotate the rotor 6, which in turn rotates the output shaft 9 with the fan 11. A disk-shaped sensor magnet 13 is fitted on the bottom of the output shaft 9. A Hall device 14 is mounted on the circuit plate 12 in facing relation with the sensor magnet 13. The Hall device 14 responds to magnetic flux of the sensor magnet 13 thereby to detect rotational angle of the rotor 6, so that the exciting circuit regulates the exciting current in response to the detected rotational angle.

A lower casing 15 is fixed to the motor holder 1 thereby to cover the circuit plate 12. The lower casing 15 is made of a synthetic resin, and shaped to have an annular peripheral wall. The circuit plate 12 is disposed within a space 16 provided between the motor holder 1 and the lower casing 15.

The stator 2, specifically the bottom of the center piece 3, is fixed to the motor holder 1. That is, the center piece 3 is formed at the bottom thereof with a disk-shaped fixing plate 17 that extends in a radial direction and in a circumferential direction. The fixing plate 17 is formed with three bosses 18 that extends downward, that is, towards the circuit plate 12. The bosses 18 are formed at a uniform angular interval, although only one is shown in FIG. 1.

Figure 3:
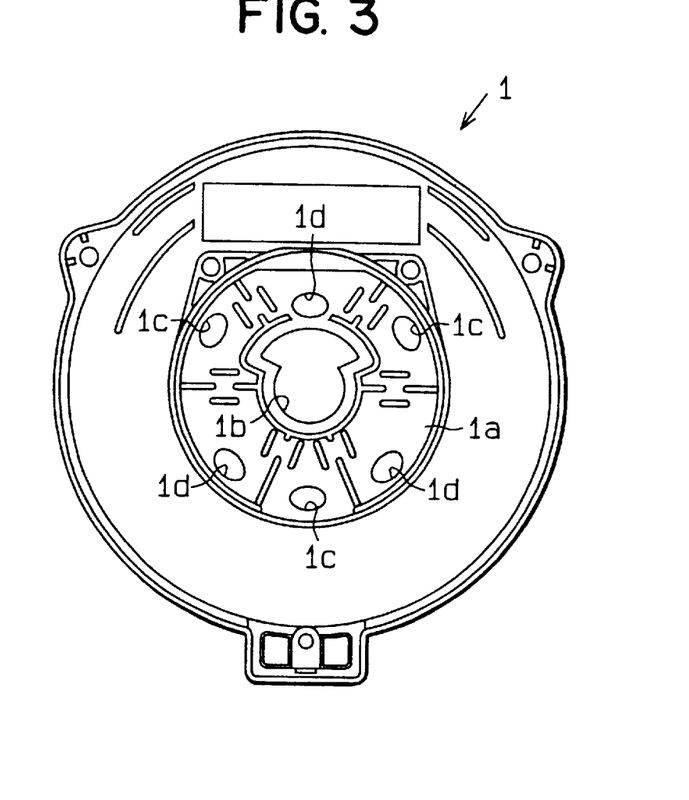
FIG. 3 is a plan view of a motor holder used in the first embodiment.

The motor holder 1 is shaped in generally a cup configuration as shown in FIG. 3. The motor holder 1 is formed with a generally circular recess or disk-shaped bottom 1a at its central part to accommodate the stator 2 and the center piece 3. A central hole 1b is formed in the bottom of the recess 1a to pass the output shaft 9. A plurality of (three) cushion fixing holes 1c are formed around the central hole 1b at uniform angular interval (120°), and a plurality of (three) cushion fixing holes 1d are also formed around the central hole 1b. Each fixing hole 1d is provided between two adjacent fixing holes 1c. Each of the fixing holes 1c and 1d is elongated in an elliptic shape that has a longer diameter in the circumferential direction of the output shaft 9 and a shorter diameter in the radial direction of the output shaft 9.

Figure 2A:
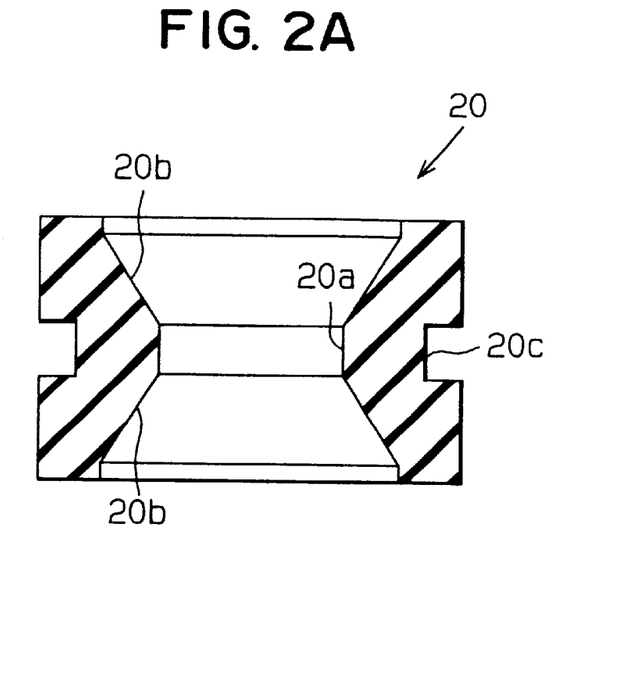
FIGS. 2A and 2B are a sectional view and a plan view of a cushion used in the first embodiment.
Figure 2B:
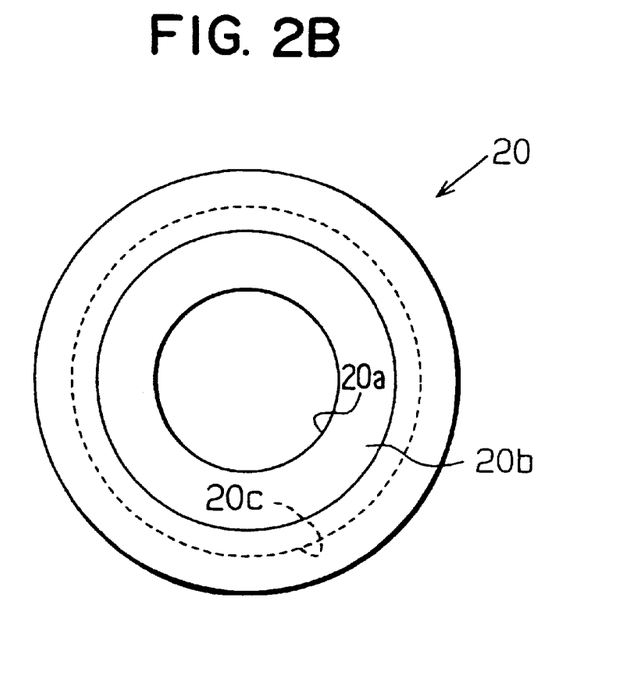

A vibration-restricting cushion 20 is fit in each fixing hole 1c. The cushion 20 is made of a rubber having hardness of about 20–40 (JIS-A). The cushion 20 is shaped in a generally cylindrical form as shown in FIGS. 2A ad 2B. It has, on the inner peripheral side thereof, an abutting or protruding surface 20a of a fixed diameter at the central position in the axial direction. The surface 20a protrudes inward in the radial direction thereof. It also has surfaces 20b extending from the abutting surface 20a upward and downward. Each tapered surface 20 is enlarged in diameter as it extends toward the end opening. Thus, the axial length of the abutting surface 20a is shorter than the entire axial length of the cushion 20.

The cushion 20 is also formed with a fitting groove 20c annularly on its outer peripheral surface at a position radially outside the abutting surface 20a. The diameter of the innermost surface of the fitting groove 20c is set longer and shorter than the shorter diameter and the longer diameter of each of the fixing holes 1c and 1d, respectively. The cushion 20 is fixed to the motor holder 1 with its groove 20c being force-fit in the fixing hole 1c of the motor holder 1. The cushion 20 deformed into an elliptic shape in compliance with the fixing hole 1c as shown in FIG. 4, when fit in the fixing hole 1c.

Figure 4:
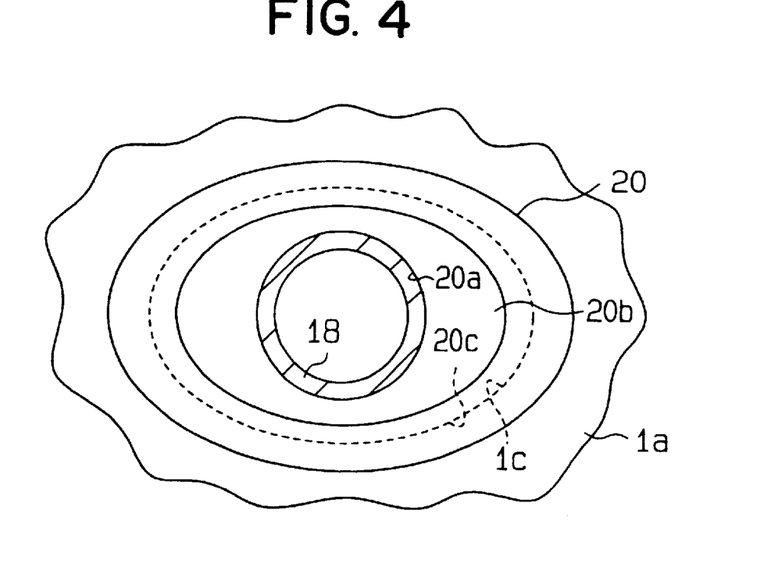
FIG. 4 is a schematic view of a fixing hole, a boss and the cushion used in the first embodiment.

The boss 18 of the fixing plate 17 is inserted into the cushion 20 as shown in FIG. 4. The boss 18 abuts the abutting surface 20a of the cushion 18, while not contacting the tapered surfaces 20b. A holding plate 21 is fixed to the fixing plate 17 by a screw 22 which is threaded into the thread hole 19 of the boss 18 of the fixing plate 17. The cushion 20 is thus interposed or sandwiched between the fixing plates 17 and 21 with its top and bottom being in abutment with the fixing plates 17 and 21, respectively. With the screw 22 being threaded into the thread hole 19, the boss 18 is held fixedly in the fixing hole 1c of the motor holder 1, thereby holding the center piece 3 fixedly to the motor holder 1.

A vibration-restricting cushion 23 is fit in each fixing hole 1d to restrict vibrations in the axial direction. The cushion 23 is interposed between the two fixing plates 17 and 21. The cushion 23 is made and shaped similarly to the cushion 20, but no boss of the fixing plate 17 is inserted into the cushion 23.

In the brushless motor apparatus of the first embodiment, the abutting surface 20a of the cushion 20 is made shorter than the entire length of the cushion 20 in the axial direction. Further, the fixing hole 1c is shaped in the elliptic form and the boss 18 is inserted in the cushion 20. As a result, the cushion 20 has a relatively small spring constant in the circumferential direction, that is, in the rotation direction of the output shaft 9, while having relatively large spring constants in the axial direction and in the radial direction. Thus, the cushion 20 is enabled to easily bend in the rotation direction, thus restricting transmission of the vibrations in the rotation direction. The cushion 23 is fit in each fixing hole 1d without holding the boss therein. As a result, the cushion 23 functions to increase a spring constant in the axial direction without increasing a spring constant in the rotation direction of the output shaft 9.

Figure 5:
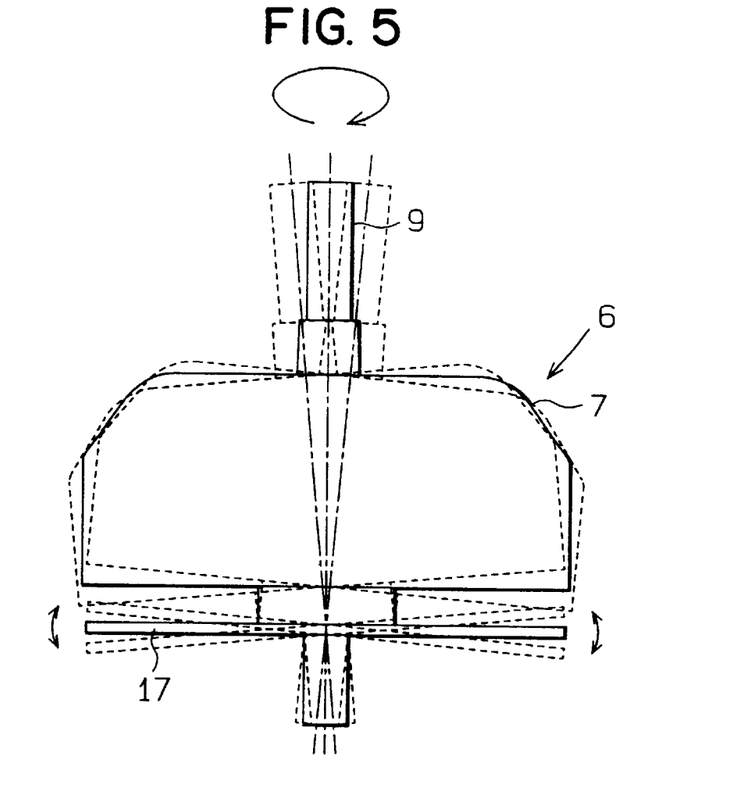
FIG. 5 is a schematic view of a rotor in an inclined rotary motion.

The cushions 20 and 23 are set to have the characteristics of the spring constants (vibration transmission characteristics) in the rotation direction similarly to the characteristics S shown in FIG. 6, and the characteristics of the spring constants in the axial direction and in the radial direction similarly to the characteristics H shown in FIG. 6. The cushion 20 thus attenuates particularly the higher-order components of the vibration of the fixing plate 17 that arises form the magnetic variation in the rotation direction. The cushions 20 and 23 thus attenuate particularly the first-order component of the vibration of the fixing plate 17 that arises from the inclined motion in the axial direction and in the radial direction as shown in FIG. 5. This motion is defined as a rotary motion of the rotor 2 with the output shaft 9 being inclined from its normal position. This inclined motion is caused due to the weight imbalance of the rotor 2.

(Second Embodiment)

Figure 7A:
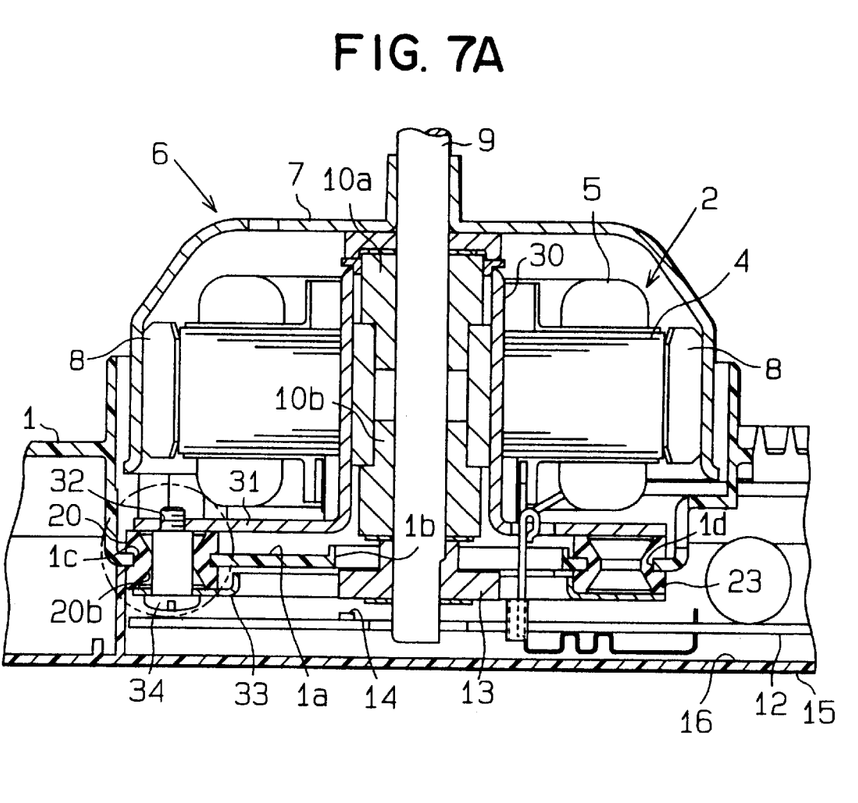
FIG. 7A is a sectional view of a brushless motor apparatus according to a second embodiment of the invention.
Figure 7B:
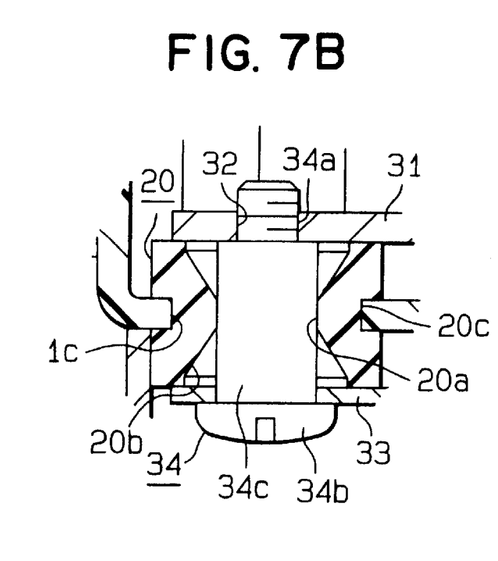
FIG. 7B is an enlarged view of a cushion used in the second embodiment.

In a second embodiment, a fixing plate 31 of a center piece 30 is not formed with any bosses, and is fixed to the motor holder 1 as shown in FIGS. 7A and 7B. That is, the fixing plate 31 is formed with a plurality of (three) fixing holes 32 at the uniform angular interval. The cushion 20 is interposed between the fixing plates 31 and 33 in the sandwiched manner. The fixing plate 31 is fixed to the fixing plate 31 by a screw 34 that passes through the cushion 20 and is threaded into a fixing hole 32 of the fixing plate 31. The screw 34 has a threaded part 34a, a head 34b and an unthreaded central column part 34c. The column part 34c has the same outer diameter as that of the boss 18 (first embodiment) to tightly abut the abutting surface 20a of the cushion 20.

The second embodiment operates in the similar manner as in the first embodiment with respect to the reduction of vibrations of the apparatus. It is to be noted, however, that the screw 34 has no threaded part around the column part 34c and hence the abutting part 20a is not damaged by threads. It is also to be noted that the center piece 30 can be manufactured with ease an in low cost because its fixing plate 31 need not be formed with any bosses. The fixing hole 32 need not be threaded, and the fixing plates 31 and 33 may be fixed to each other by a rivet without using the threaded screw 34.

(Third Embodiment)

Figure 8A:
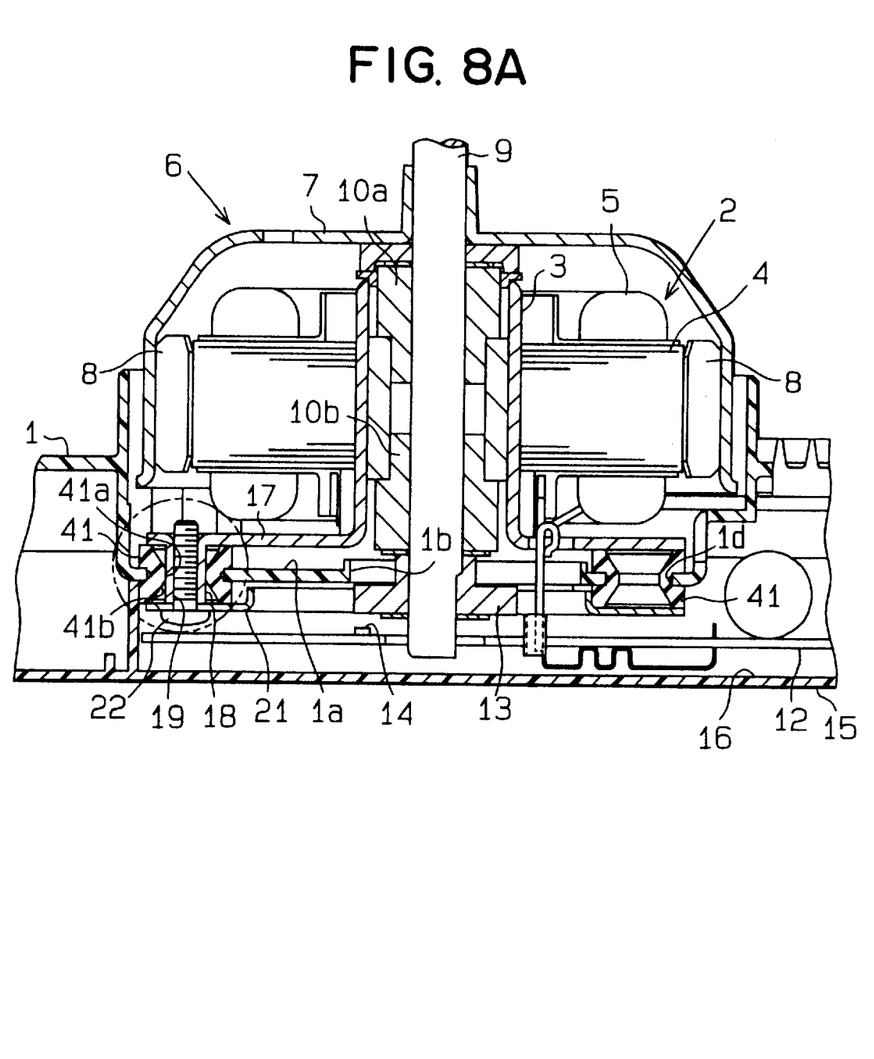
FIG. 8A is a sectional view of a brushless motor apparatus according to a third embodiment of the invention.
Figure 8B:
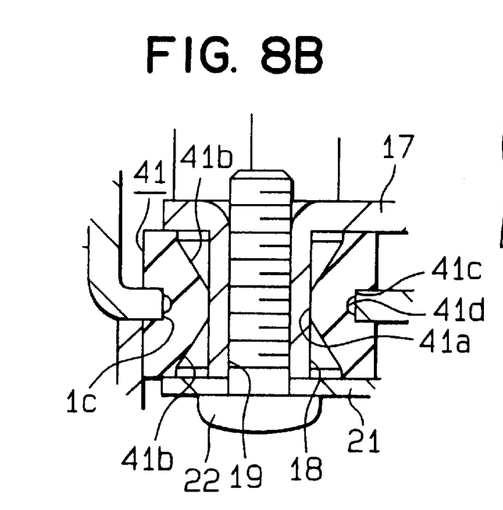
FIG. 8B is an enlarged view of a cushion used in the third embodiment.

In a third embodiment, a cushion 41 sandwiched between the fixing plates 17 and 21 is shaped as shown in FIGS. 8A and 8B. The cushion 41 is shaped to have an abutting surface 41a and tapered surfaces 41b in the same manner as in the first and the second embodiments. The cushion 41 has a fixing groove 41c around its outer peripheral surface at the central position in the axial direction. The diameter of the bottom of the fixing groove 41c is larger and smaller than the shorter diameter and the larger diameter of the fixing holes 1c and 1d, respectively. An inside groove 41d is also formed on the bottom of the fixing groove 41c. It extends annularly at the central position of the bottom in the axial direction. The inside groove 41d is shaped semi-circularly in cross section.

The third embodiment also operates in the similar manner as in the first and the second embodiments with respect to the reduction of vibrations of the apparatus. It is to be noted, however, the cushion 41 is more bendable in the rotation direction of the output shaft 9 due to the inside groove 41d. The inside groove 41c need not extend annularly, but may be formed at only two positions in the rotation direction. The inside groove 41c may be shaped in V-form in cross section.

(Modification)

In each of the foregoing embodiments, the axial length of the abutting surfaces 20a and 41a may be set to be equal to the entire axial length of the cushions 20 and 41 while maintaining the elliptic shape of the fixing holes 1c and 1d. Alternatively, the fixing holes 1c and 1d may be shaped in a circle of a fixed diameter, while maintaining the axial length of the abutting surfaces 20a and 41a shorter than the entire length of the cushions 20 and 41. The fixing holes 1d and the cushion 23 maybe eliminated. The cushions 20 and 41 may be made of ant materials other than the rubber having a hardness of 20–40.

The abutting surfaces 20a and 41a may be formed at one axial end of the cushions 20 and 41, and the tapered surface 20b and 41b may be formed to extend only in the direction toward the other end of the cushions 20 and 41. In this instance also, the cushions 20 and 41 are easily bendable in the rotation direction of the output shaft 9. That is, the spring constant of the cushions 20 and 41 in the rotation direction is relatively small, while the spring constant of the same in the axial direction is relatively large.

The axial length of the abutting surfaces 20a and 41a need not be shorter at any circumferential position, as long as it is shorter at positions in the rotation direction, that is, at the rightmost and leftmost sides in FIG. 4. In this instance also, the spring constant of the cushions 20 and 41 in the rotation direction is relatively small, while the spring constant of the same in the axial direction is relatively large.

The fixing holes 1c and 1d may be shaped in any form different from an ellipse, as long as the size in the rotation direction is longer than that in the radial direction. For instance, it may be shaped to have a pair of parallel long sides connected by a pair of circular sides at the ends of the long sides in the rotation direction.

The present invention should not be limited to the above embodiments and modifications, but may be implemented in many other ways without departing from the spirit of the invention.

What is claimed is:

1. A motor apparatus comprising:

a motor holder;

a stator having a center piece that includes a fixing plate at one end thereof, the fixing plate being formed with a boss and the boss being held engaged with the motor holder;

a rotor rotatably supported by the stator to be rotated when the stator is energized; and a cushion interposed between the motor holder and the boss, wherein the cushion is formed in generally a cylindrical shape to have an abutting surface on an inner peripheral surface for abutment with an outer peripheral surface of the boss and an annular groove on an outer peripheral surface for engagement with the motor holder, the inner abutting surface having an axial length shorter than an entire axial length of the cushion, wherein the motor holder is formed with a fixing hole in which the cushion is fit, wherein the cushion is fixedly held to the fixing plate by a holding plate in an axial direction, and wherein the fixing hole of the fixing plate is elongated in a circumferential direction of the rotor to have a length in the circumferential direction longer than that in a radial direction of the rotor.

2. A motor apparatus comprising:

a motor holder;

a stator having a center piece that includes a fixing plate at one end thereof, the fixing plate being formed with a fixing hole;

a rotor rotatably supported by the stator to be rotated when the stator is energized;

a fixing member fit in the fixing hole for fixing the center piece to the motor holder; and a cushion interposed between the motor holder and the fixing plate, wherein the cushion is formed in generally a cylindrical shape to have an abutting surface on an inner peripheral surface for abutment with an outer peripheral surface of the fixing member and an annular groove on an outer peripheral surface for engagement with the motor holder, the inner abutting surface having an axial length shorter than an entire axial length of the cushion, wherein the motor holder is formed with a fixing hole in which the cushion is fit, wherein the cushion is fixedly held to the fixing plate by a holding plate in an axial direction, and wherein the fixing hole of the fixing plate is elongated in a circumferential direction of the rotor to have a length in the circumferential direction longer than that in a radial direction of the rotor.

3. The motor apparatus of claim 1 or 2, wherein:

the abutting surface and the annular groove are formed at a generally intermediate position in the axial direction between axial ends of the cushion; and the cushion is formed with tapered surfaces on the inner peripheral surface, the tapered surfaces being enlarged in diameter from the abutting surface toward the axial ends.

4. The motor apparatus of claim 1 or 2, wherein:

the annular groove has an inside groove on its bottom.

5. The motor apparatus of claim 1 or 2, wherein:

the motor holder has another fixing hole;

another cushion is fit in the another fixing hole; and the another cushion is fixedly held between the fixing plate of the center piece and the holding plate.

6. The motor apparatus of claim 2, wherein:

the fixing member is a screw having a head and a threaded part, the threaded part being threaded into the fixing hole of the fixing plate with the head abutting the holding plate.

7. The motor apparatus of claim 6, wherein:
the screw has an unthreaded column part between the threaded part and the head, the column part being in abutment with the abutting surface of the cushion.

8. A motor apparatus comprising:
a motor holder;
a stator having a center piece that includes a fixing plate at one end thereof, the fixing plate being formed with a boss and the boss being held engaged with the motor holder;
a rotor rotatably supported by the stator to be rotated when the stator is energized;
a first cushion interposed between the motor holder and the boss,
a second cushion interposed between the motor holder and the fixing plate,
wherein the first cushion is formed in generally a cylindrical shape to have an abutting surface on an inner peripheral surface for abutment with an outer peripheral surface of the boss and an annular groove on an outer peripheral surface for engagement with the motor holder,
wherein the motor holder is formed with a first fixing hole in which the first cushion is fit and a second fixing hole in which the second cushion is fit,
wherein the first cushion and the second cushion are fixedly held to the fixing plate by a holding plate in an axial direction, and
wherein the second cushion has a free space defined by an inner peripheral surface thereof, the fixing plate of the center piece and the holding plate.

9. A motor apparatus comprising:
a motor holder;
a stator having a center piece that includes a fixing plate at one end thereof, the fixing plate being formed with a fixing hole;
a rotor rotatably supported by the stator to be rotated when the stator is energized;
a fixing member fit in the fixing hole for fixing the center piece to the motor holder;
a first cushion interposed between the motor holder and the fixing plate,
a second cushion interposed between the motor holder and the fixing plate,
wherein the first cushion is formed in generally a cylindrical shape to have an abutting surface on an inner peripheral surface for abutment with an outer peripheral surface of the fixing member and an annular groove on an outer peripheral surface for engagement with the motor holder,
wherein the motor holder is formed with a first fixing hole in which the first cushion is fit and a second fixing hole in which the second cushion is fit,
wherein the first cushion and the second cushion are fixedly held to the fixing plate by a holding plate in an axial direction, and
wherein the second cushion has a free space defined by an inner peripheral surface thereof, the fixing plate of the center piece and the holding plate.

10. The motor apparatus of claim 8 or 9, wherein:
the first fixing hole and the second fixing hole are formed alternately on the motor holder; and
the first fixing hole and the second fixing hole are formed in a same shape that has a length in a circumferential direction of the rotor longer than a length in a radial direction of the rotor.

11. The motor apparatus of claim 10, wherein:
the first cushion and the second cushion are formed to have a same shape in which the inner peripheral wall is enlarged from a central part thereof toward axial ends thereof in an axial direction of the rotor.

12. The motor apparatus of claim 8 or 9, wherein:
the rotor has an output shaft rotatably fit in the stator and a fan fixed to the output shaft at one axial side of the output shaft.

13. A motor apparatus comprising:
a motor holder formed in a cup shape having a bottom plate and a plurality of fixing holes in the bottom plate, each of the fixing holes being formed in an elongated shape in a circumferential direction;
a stator accommodated in the motor holder;
a rotor including an output shaft and a rotary body fixed to an end of the output shaft, the rotor being rotatable in response to energization of the winding;
a fixing plate fixed to the stator and disposed between the bottom plate of the motor holder and the stator;
an elastic cushion formed in a generally cylindrical shape and fit in each of the fixing holes of the motor holder in a manner deformed in conformance to the elongated shape of the fixing hole, thereby providing a spring constant in a rotation direction of the rotor smaller than a spring constant in a radial direction of the rotor; and
fixing member fit in the cushion in an axial direction of the cushion to tightly hold the motor holder and the fixing plate in the axial direction.

14. The motor apparatus of claim 13, wherein:
the cushion has an outer peripheral surface thereof for engaged with the bottom plate of the motor holder and a protruded surface on an inner peripheral surface protruding inward in a radial direction so that only the fixing member abuts the protruded surface.

15. The motor apparatus of claim 14, wherein:
the protruded surface is formed only partly at an axial position opposite a position where the outer peripheral surface is engaged with the bottom plate.

16. The motor apparatus of claim 13, further comprising:
a holding plate disposed opposite the fixing plate with respect to the bottom plate of the motor holder, the holding plate being fixed to the fixing plate by the fixing member in the axial direction while sandwiching the cushion therebetween.

17. The motor apparatus of claim 16, wherein:
the bottom plate has a plurality of another fixing holes;
another cushion is fit in each of the another fixing holes and sandwiched between the holding plate and the fixing plate; and
the another cushion has an inner free space defined by an inner peripheral surface, the fixing plate and the holding plate.

18. A motor apparatus comprising:
a motor holder;
a stator having a center piece that includes a fixing plate at one end thereof, the fixing plate being formed with a boss and the boss being held engaged with the motor holder;
a rotor rotatably supported by the stator to be rotated when the stator is energized; and
a cushion interposed between the motor holder and the boss, wherein the cushion is formed in generally a cylindrical shape to have an abutting surface on an inner peripheral surface for abutment with an outer peripheral surface of the boss and an annular groove on an outer peripheral surface for engagement with the motor holder, the inner abutting surface having an axial length shorter than an entire axial length of the cushion, wherein the motor holder is formed with a fixing hole in which the cushion is fit, wherein the cushion is fixedly held to the fixing plate by a holding plate in an axial direction, and wherein the annular groove has an inside groove on its bottom.

19. A motor apparatus comprising:

a motor holder;

a stator having a center piece that includes a fixing plate at one end thereof, the fixing plate being formed with a fixing hole;

a rotor rotatably supported by the stator to be rotated when the stator is energized;

a fixing member fit in the fixing hole for fixing the center piece to the motor holder; and a cushion interposed between the motor holder and the fixing plate, wherein the cushion is formed in generally a cylindrical shape to have an abutting surface on an inner peripheral surface for abutment with an outer peripheral surface of the fixing member and an annular groove on an outer peripheral surface for engagement with the motor holder, the inner abutting surface having an axial length shorter than an entire axial length of the cushion, wherein the motor holder is formed with a fixing hole in which the cushion is fit, wherein the cushion is fixedly held to the fixing plate by a holding plate in an axial direction, and wherein the annular groove has an inside groove on its bottom.

20. A motor apparatus comprising:

a motor holder formed in a cup shape having a bottom plate and a plurality of first fixing holes in the bottom plate, each of the first fixing holes being formed in an elongated shape in a circumferential direction;

a stator accommodated in the motor holder;

a rotor including an output shaft and a rotary body fixed to an end of the output shaft, the rotor being rotatable in response to energization of the winding;

a fixing plate fixed to the stator and disposed between the bottom plate of the motor holder and the stator;

an elastic cushion formed in a generally cylindrical shape and fit in each of the first fixing holes of the motor holder in a manner deformed in conformance to the elongated shape of the fixing hole, thereby providing a spring constant in a rotation direction of the rotor smaller than a spring constant in a radial direction of the rotor;

a fixing member fit in the cushion in an axial direction of the cushion to tightly hold the motor holder and the fixing plate in the axial direction;

wherein the bottom plate has a plurality of second fixing holes;

a second cushion is fit in each of the second fixing holes and sandwiched between the holding plate and the fixing plate; and the second cushion has an inner free space defined by an inner peripheral surface, the fixing plate and the holding plate.

* * * * *

UNITED STATES PATENT AND TRADEMARK OFFICE
CERTIFICATE OF CORRECTION

PATENT NO.   : 6,339,267 B1
DATED        : January 15, 2002
INVENTOR(S)  : Yoshikazu Fujii and Hideto Matsuzaki It is certified that error appears in the above-identified patent and that said Letters Patent is hereby corrected as shown below:

<u>Title page,</u>
Item [74], correct the Firm name "Law Office of David G. Poss" to be -- Law Office of David G. Posz --

Signed and Sealed this

Ninth Day of September, 2003

JAMES E. ROGAN
*Director of the United States Patent and Trademark Office*